United States Patent [19]

Simonson, Jr.

[11] Patent Number: 4,476,618

[45] Date of Patent: Oct. 16, 1984

[54] CONDUIT SETTING IMPLEMENT

[76] Inventor: William B. Simonson, Jr., 4232 First Ave., Hibbing, Minn. 55746

[21] Appl. No.: 410,364

[22] Filed: Aug. 23, 1982

[51] Int. Cl.³ .............................................. B25B 27/04
[52] U.S. Cl. ........................................ 29/272; 294/97
[58] Field of Search ................. 294/97, 93, 86.24, 90, 294/86.17; 29/271, 272, 267, 239, 238

[56] References Cited

U.S. PATENT DOCUMENTS

| | | |
|---|---|---|
| 141,233 | 7/1873 | Okerlund . |
| 167,626 | 9/1875 | Stellwagen . |
| 179,360 | 6/1876 | Sherfey ............................ 294/86.17 |
| 186,943 | 2/1877 | Moore . |
| 222,784 | 12/1879 | Hoover . |
| 435,594 | 9/1890 | Teetzel . |
| 517,329 | 3/1894 | Cook ..................................... 294/93 |
| 529,776 | 11/1894 | Brown ............................. 294/86.24 |
| 621,380 | 3/1899 | Shoffner . |
| 728,110 | 5/1903 | Jenkins ................................ 294/97 |
| 735,616 | 8/1903 | Stitt .................................... 294/97 |
| 1,100,019 | 6/1914 | Johnson . |
| 1,171,580 | 2/1916 | Atterbury ............................ 294/97 |
| 2,156,651 | 5/1939 | Gardiner .............................. 29/272 |
| 2,370,482 | 2/1945 | Morgan et al. ....................... 294/97 |
| 2,558,114 | 6/1951 | Williams et al. . |
| 2,670,233 | 2/1954 | Barchoff . |
| 2,677,570 | 5/1954 | Mertes . |
| 2,794,669 | 6/1957 | Schardinger . |
| 2,951,725 | 9/1960 | St. Jean ............................... 294/97 |
| 4,085,958 | 4/1978 | Gaudette . |
| 4,285,538 | 8/1981 | Luke ................................... 294/97 |

Primary Examiner—Robert C. Watson
Attorney, Agent, or Firm—Schroeder, Siegfried, Vidas & Arrett

[57] ABSTRACT

An implement for setting individual conduit units in end-to-end stacking relation. First and second members are resiliently biased in spaced relation to each other. Cleats extend from the spaced members for supporting an end of a conduit unit. A toggle extends between the spaced members with its arm pivotally joined to those members at one end and to a common knee at their other end. In a preferred embodiment, the toggle is an over-center device having a stop with the cleats being spaced from each other sufficiently to engage an end of a conduit unit when the toggle is in the over-center position. Flexing of the toggle from the over-center position results in a withdrawal of the cleats from the conduit unit end. Positive release of the cleats from the conduit unit end is assured by members extending from each of the spaced members toward the other of the spaced members to engage a conduit unit supported by the cleats during flexing of the toggle. At least one of the toggle arms may be adjustable to accommodate varying sizes of conduit, or variations in actual size within a nominal conduit size, and provision is made to center the implement within a conduit unit while positioning a supported conduit unit in end-to-end relation with another.

7 Claims, 6 Drawing Figures

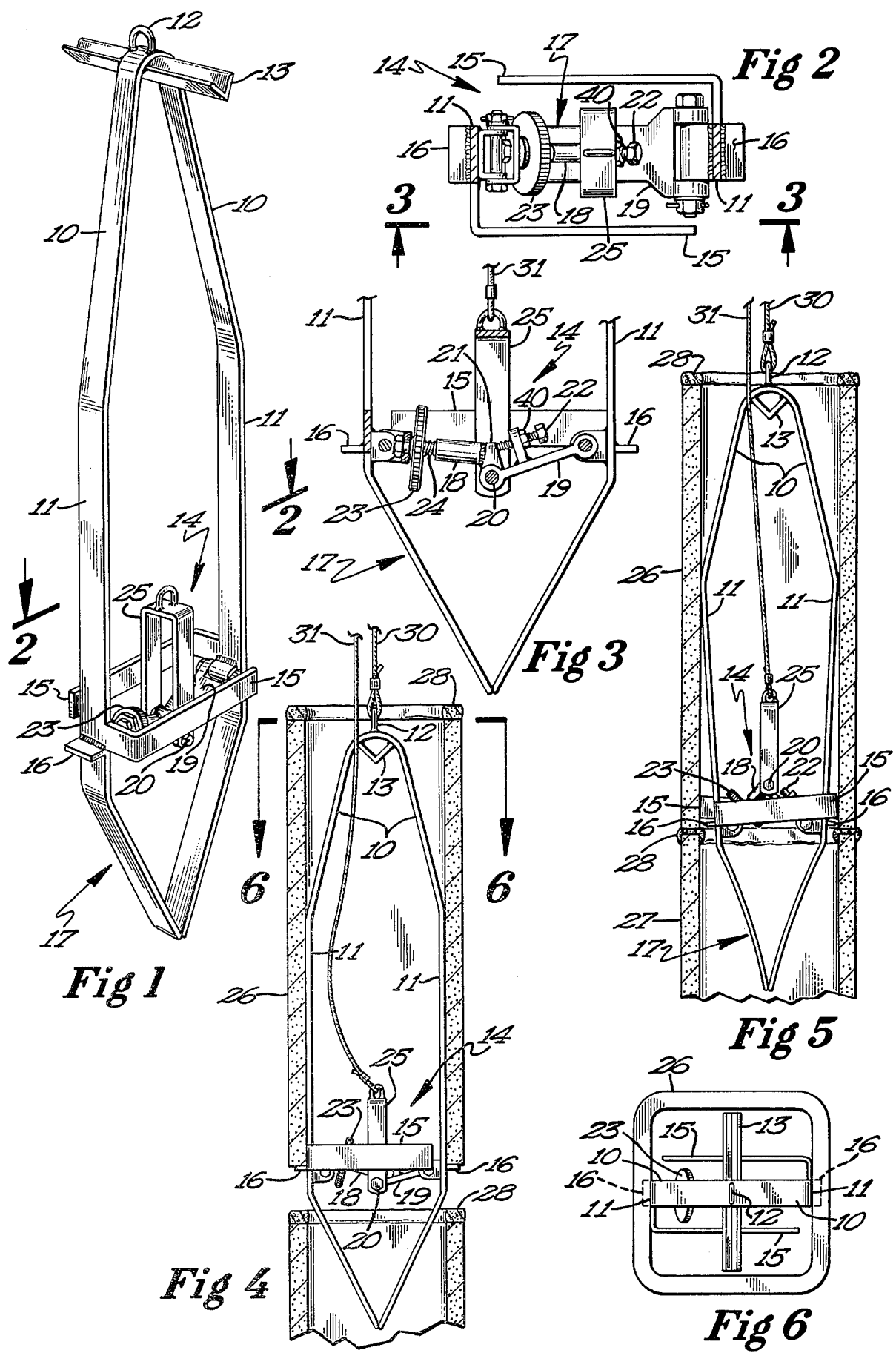

CONDUIT SETTING IMPLEMENT

Background of Prior Art

The present invention relates to the setting of individual conduit units in end-to-end stacking relation with each other and, particularly, to the setting of tiles within a chimney flue.

Implements for the setting of conduit units for such applications as chimney lining and well walling are known to the prior art. Such applications require transportation of the conduit unit to the desired site and a proper positioning of the individual units relative to each other. These two operations are referred to herein as a setting of the conduit unit. Often, conduit setting has been accomplished by means of implements which engage a wall of the conduit passageway, an example of such an implement being disclosed in U.S. Pat. No. 2,794,669. Dependent upon the conduit material, such implements run the risk of exerting excessive force on the conduit wall and may result in distortion or damage to the conduit. This is particularly true in the instance of clay chimney liners.

Other conduit setting implements provide members which engage an end of the conduit thereby avoiding problems resulting from the application of a force on the conduit passageway wall. Examples of such implements are disclosed in U.S. Pat. Nos. 141,233 and 167,626. Such systems typically have a single stable or self-sustaining position with a force being required to establish and maintain a second position, for release of the conduit, for example. Such forces are commonly applied through a rope attached to the implement with a constant tension on the rope being required to maintain the unstable position. Clearly, maintenance of the unstable position in this manner is cumbersome.

Brief Summary of Invention

The present invention provides for setting individual conduit units in end-to-end relation to each other, the implement having two stable positions. In one position, the conduit is supported by the implement while that support is withdrawn on movement of the implement to the second position. External force activates movement between the first and second positions, but no external force is necessary to maintain either position.

In a preferred embodiment, first and second members are resiliently biased in spaced relation to each other, each member carrying an extending cleat for supporting an end of a conduit unit. A toggle is positioned in the space between the members with arms pivotally joined at one end at a knee and at their other end at a different one of the spaced members. The toggle is an over-center device having a stop, the stop providing a first stable position wherein the cleat spacing is such that they will engage an end of a conduit placed over the implement. Flexing of the toggle to a second stable position results in a decrease in the spacing between cleats and a release of the previously supported conduit unit. Adjustment in the spacing between cleats in the first position may be provided by a length adjustment in at least one of the toggle arms while release of the conduit by movement of the toggle to the second position may be facilitated by members extending from each of the spaced members towards the other spaced member to engage a conduit supported by the cleats during flexing of the toggle and withdrawal of the cleats from the conduit end. This reduces the possibility of displacement or movement of the conduit during cleat withdrawal. Provision is made to center the implement within a conduit unit to be set and to position that conduit in end-to end relation with another already set conduit.

Brief Description of Drawings

FIG. 1 shows, in perspective, a preferred embodiment of the present invention.

FIG. 2 is a cross section of the embodiment of FIG. 1 taken along the line 2—2 in FIG. 1.

FIG. 3 is a view of the embodiment of FIG. 1 and 2 taken along the line 3—3 in FIG. 2.

FIG. 4 illustrates the support of a conduit unit and its positioning in end-to-end relation to another conduit unit in accordance with the present invention.

FIG. 5 illustrates a conduit set relative to another conduit with the support of the implement of the present invention withdrawn.

FIG. 6 is a view taken along the line 6—6 in FIG. 4.

Detailed Description of Invention

FIG. 1 illustrates, in perspective, a preferred embodiment of the present invention. An upper frame is formed of legs or members 10 at least a portion of which, 11, are in spaced relation to each other. The members 10 are shown as an integral structure and may be formed of a suitable metal such that the portions 11 are resiliently biased in spaced relation to each other. The apex of the legs 10 is provided with an eye 12 and a bar 13, both of which will be described more fully below. The space between the member portions 11 is provided with a toggle generally indicated at 14 and each member carries an extending projection 15, the projections 15 extending from each of the spaced members towards the other. Cleats 16 (one shown in FIG. 1) also extend from the members 10 with the members 10 terminating at their lower end in a triangular configuration indicated generally at 17.

The construction and operation of the toggle 14 is best illustrated in FIG. 3 wherein toggle arms 18 and 19 have a common pivot or knee 20 and extend from the knee 20 to a second pivot connection carried by different ones of the member portions 11. A stop is provided by an abutment 21 and cooperating bolt 22, the bolt 22 being carried by the arm 19. The length of the arm 18 is adjustable on rotation of a thumb screw 23, the thumb screw 23 being secured to a threaded rod 24 which threadedly engages a taped bore within a stub forming the remainder of the arm 18. A tang 25 is also pivotally supported at the knee 20.

In the position illustrated in FIG. 3, the toggle 14 is in a position that has been referred to as "over-center" and the member portions 11 are displaced outwardly from their "at rest" position. Through the action of the stop formed of elements 21 and 22 and the resiliency of the legs 10, the toggle position illustrated in FIG. 3 is a stable position in that it will be maintained in the absence of a force that induces a flexing of the toggle 14.

The toggle position illustrated in FIG. 3 is the "supporting" position in that it is intended that the cleats 16 be sufficiently spaced from each other to engage an end of a conduit unit to be set. Spacing between the cleats 16 may be adjusted by rotation of the thumb wheel 23 either to accomodate different intended conduit sizings or variations in sizing for a nominally given conduit size. Conduit support is illustrated in FIG. 4 wherein one conduit 26 is supported by the implement, through the action of the cleats 16, in position above a second generally vertical conduit unit 27. As illustrated in FIG. 4, the upper ends of the conduits 26 and 27 may be provided with a cement or adhesive 28 to seal and/or secure the abutment between the conduit units 26 and 27.

The implement is supported on a rope 30 secured to the eye 12 with the rope 30 being manipulated to lower the conduit 26 toward the conduit 27. The portion 17 of the implement will enter the passageway of the conduit 27 to position the conduit 26 relative to the conduit 27 as the conduit 26 is lowered. The proper position of conduit 26 relative to conduit 27 is illustrated in FIG. 5.

Referring now specifically to FIG. 5, an upward force applied to the tang 25 (via a rope 31) will result in a flexing of the toggle 14 to the illustrated position through the force provided by the resiliency of the members 10 once the toggle 14 has been moved past the "over-center" position. This second position is also a stable position in that it will be maintained through the resiliency of the members 10 without a continuing application of force on the tang 25. As the toggle moves from the position illustrated in FIG. 3 and 4 to the position illustrated in FIG. 5, the members 15 will extend toward the passageway wall of the conduit unit 26 to maintain the position of the conduit as the cleats 16 are removed from the abutment between the conduit units 26 and 27. The cooperation of the projecting members 15 with the passageway wall is illustrated in FIG. 5. Bar 13 serves to maintain the implement centered within the conduit as best illustrated in FIG. 6. When necessary, because of the conduit dimensions, bar 13 may be extended by securing extensions to it in any convenient manner. For example, the implement may be configured to operate with 8"×8" square conduits. It can easily be adapted to operate with 8"×12" rectangular conduits by having the cleats 16 operate across the 8" dimension with the bar 13 being extended to span the 12" dimension.

Obviously, many modifications and variations of the present invention are possible in light of the above teachings. For example, the toggle flexing force applied to the tang 25 is illustrated as being applied by a rope 31. However, any connection to the tang 25 that will allow a distant force to be transmitted to the tang 25 will result in the necessary toggle flexing. A force may also be applied directly to the knee 20 to induce knee flexing to the second position. It is therefore to be understood that, within the scope of the appended claims, the invention may be practiced otherwise than as specifically described.

I claim:

1. An implement for setting conduit units in end-to-end stacking relation comprising:
   first and second oppositely disposed members resiliently biased in spaced relation to each other;
   cleat means extending from said spaced members for supporting a conduit unit;
   toggle means having two stable positions, said toggle means being in the space between said members and having arms pivotally joined at one end at a knee and at their other end at a different one of said members;
   means for flexing said toggle means knee from one of said stable positions to the other; and
   means extending from each of said members in mutually opposite directions for engaging a conduit unit supported by said cleat means during flexing of said toggle means.

2. The implement of claim 1 wherein said toggle means comprises over-center means and stop means, said stop means establishing one of said stable positions.

3. The implement of claim 2 wherein the length of at least one of said arms is adjustable by means of a thumbscrew.

4. The implement of claim 1 further comprising means for centering said implement within a conduit unit.

5. The implement of claim 4 further comprising means for positioning a conduit unit supported by said cleat means in end-to-end relation to another, generally vertical conduit unit.

6. The implement of claim 5 wherein said stop means is adjustable.

7. The implement of claim 1 wherein the length of at least one of said arms is adjustable by means of a thumbscrew.

* * * * *